United States Patent
Chandwani et al.

(10) Patent No.: US 10,257,830 B2
(45) Date of Patent: Apr. 9, 2019

(54) ALLOCATING UNLICENSED AND LICENSED RADIO FREQUENCY SPECTRUM BANDS FOR THE TRANSMISSION OF AUDIO AND VIDEO PACKETS

(71) Applicant: Verizon Patent and Licensing Inc., Arlington, VA (US)

(72) Inventors: Rakesh Chandwani, Morganville, NJ (US); Sergio Aguirre, Southlake, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 194 days.

(21) Appl. No.: 14/973,221

(22) Filed: Dec. 17, 2015

(65) Prior Publication Data
US 2017/0181040 A1 Jun. 22, 2017

(51) Int. Cl.
*H04W 72/04* (2009.01)
*H04W 72/12* (2009.01)

(52) U.S. Cl.
CPC .... *H04W 72/0453* (2013.01); *H04W 72/1242* (2013.01)

(58) Field of Classification Search
CPC .......................... H04W 28/26; H04W 72/0453
See application file for complete search history.

(56) References Cited

U.S. PATENT DOCUMENTS

| | | | | |
|---|---|---|---|---|
| 8,548,305 B2* | 10/2013 | De Haan | ............... | G11B 20/10 386/335 |
| 9,241,340 B2* | 1/2016 | Yie | ................... | H04W 72/1242 |
| 2004/0203815 A1* | 10/2004 | Shoemake | ........... | H04W 72/02 455/450 |
| 2005/0201269 A1* | 9/2005 | Shim | .................... | H04L 5/0091 370/208 |
| 2008/0070632 A1* | 3/2008 | Obuchi | ............ | H04W 74/0866 455/561 |
| 2009/0144325 A1* | 6/2009 | Chastagnol | ............ | G06Q 30/06 |
| 2013/0045736 A1* | 2/2013 | Libin | .................... | H04W 16/14 455/426.1 |
| 2013/0122924 A1* | 5/2013 | Yie | ..................... | H04W 72/082 455/452.2 |
| 2013/0171991 A1* | 7/2013 | Fujino | .................. | H04W 28/08 455/435.1 |
| 2014/0282754 A1* | 9/2014 | Rehman | ................ | H04N 21/61 725/81 |
| 2015/0119062 A1* | 4/2015 | Aoki | ................... | H04W 72/082 455/452.1 |
| 2016/0095038 A1* | 3/2016 | Kuwahara | ............. | H04W 36/22 455/438 |
| 2017/0150209 A1* | 5/2017 | Rehman | ........... | H04N 21/43637 |

* cited by examiner

*Primary Examiner* — Khaled M Kassim

(57) ABSTRACT

A device may receive a request for a transmission of media content. The device may determine a set of rules associated with the transmission of the media content. The device may assign one or more radio frequency (RF) spectrum bands for the transmission of the media content. The device may provide or receive the media content via the one or more RF spectrum bands.

20 Claims, 5 Drawing Sheets

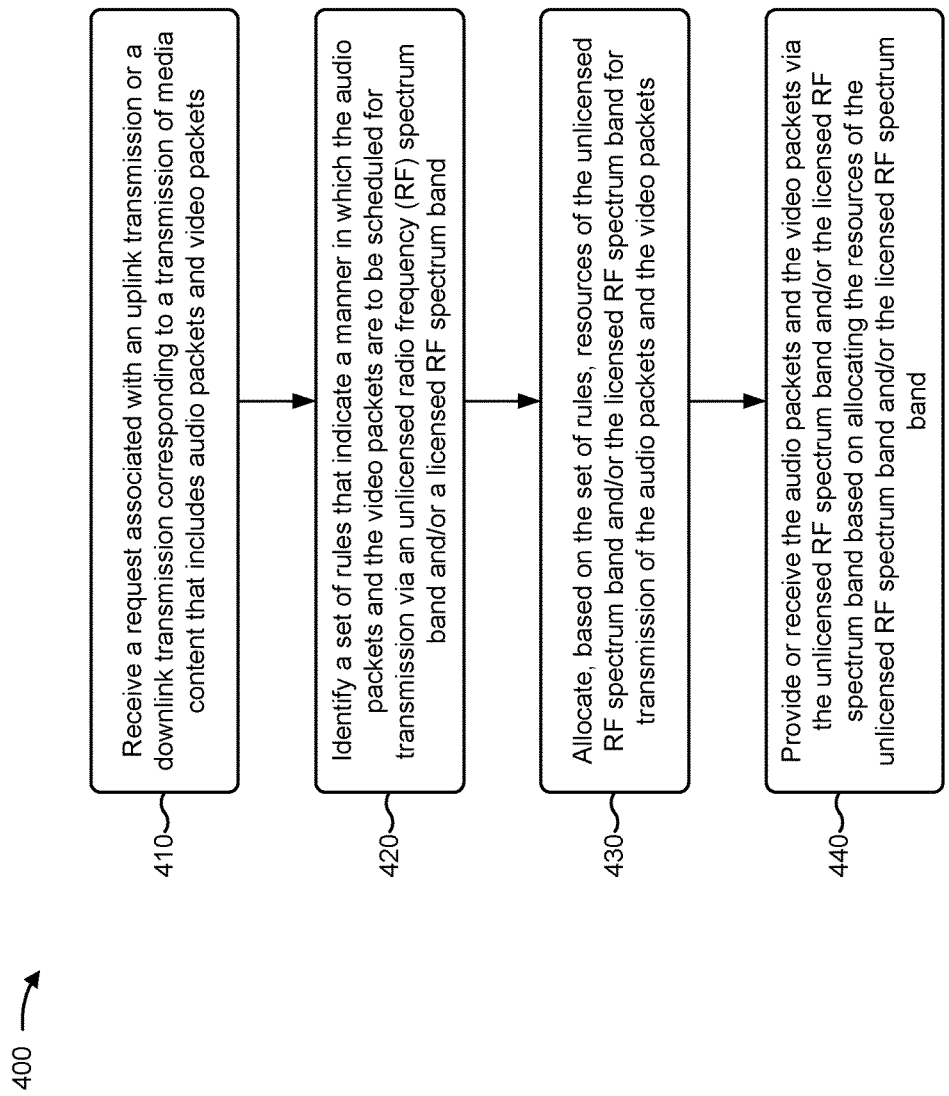

ALLOCATING UNLICENSED AND LICENSED RADIO FREQUENCY SPECTRUM BANDS FOR THE TRANSMISSION OF AUDIO AND VIDEO PACKETS

BACKGROUND

A base station may communicate with a wireless device via a telecommunication link, which may refer to a communication channel that connects two or more communicating devices (e.g., the base station and the wireless device, etc.). In some cases, the telecommunication link may include an uplink, which is the portion of the telecommunication link used for the transmission of signals from the wireless device to the base station. Additionally, or alternatively, the telecommunication link may include a downlink, which is the portion of the telecommunication link used for the transmission of signals from the base station to the wireless device. The transmission of the signals via the telecommunication link may be via an unlicensed radio frequency (RF) spectrum band or via a licensed RF spectrum band.

BRIEF DESCRIPTION OF THE DRAWINGS

FIG. 4 is a flow chart of an example process for allocating, based on a set of rules, resources of an unlicensed radio frequency spectrum band and/or a licensed radio frequency spectrum band for transmission of audio packets and video packets.

DETAILED DESCRIPTION OF PREFERRED EMBODIMENTS

Figure 1A:
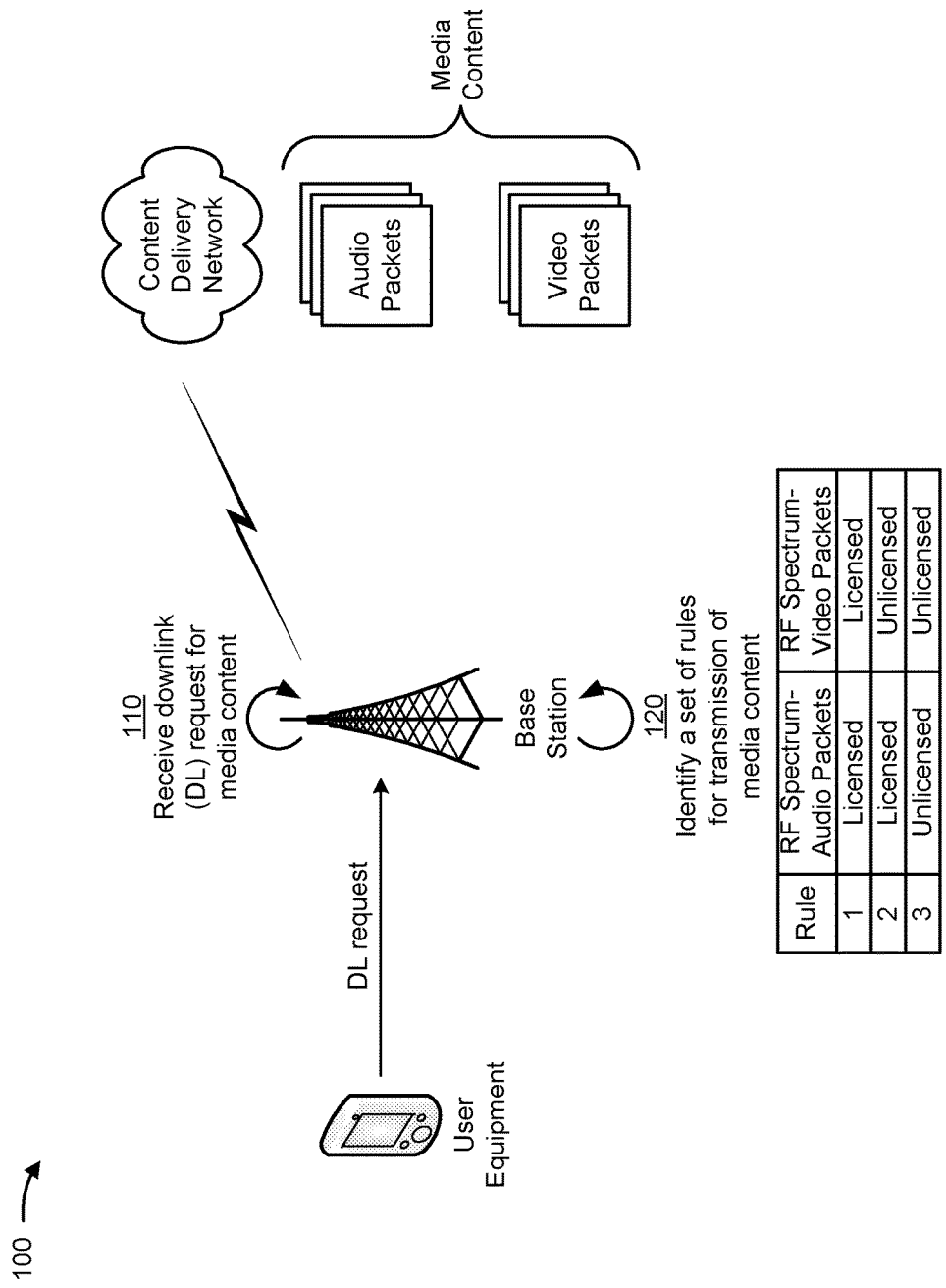
FIGS. 1A and 1B are diagrams of an overview of an example implementation described herein.

The following detailed description of example implementations refers to the accompanying drawings. The same reference numbers in different drawings may identify the same or similar elements.

A base station may communicate with a wireless device, such as a user equipment (UE), via an unlicensed RF spectrum band and/or a licensed RF spectrum band. For example, the base station may transmit media content to the UE or may receive media content from the UE. The media content may include audio packets and video packets, where the audio packets and the video packets are formatted units of data carried by a network (e.g., a packet-switched network, etc.).

For example, the base station may transmit packets of a video from a content delivery network, which may include a video streaming server, to the UE. The video may include an audio portion, corresponding to audio packets of the video, and a video portion, corresponding to video packets of the video. Delivery of the audio packets and the video packets to the UE via the licensed RF spectrum band may increase a technical performance of the transmission by reducing packet loss of the audio packets or the video packets because a network operator has greater control over the licensed RF spectrum band, which may be licensed by the network operator. However, delivery of the audio packets and the video packets via the licensed RF spectrum band may consume significant network resources of the licensed RF spectrum band, such as network bandwidth, or the like.

In contrast, delivery of the audio packets and the video packets via the unlicensed RF spectrum band may conserve network resources of the licensed RF spectrum band. However, the unlicensed RF spectrum band may be subject to more network interference, such as network congestion or RF interference, than the licensed RF spectrum band because the unlicensed RF spectrum band may be shared for use by multiple parties. Additionally, or alternatively, transmissions via the unlicensed RF spectrum band may be subject to compliance with agency regulation on radio interference from the devices of other users.

In some cases, the network interference on the unlicensed RF spectrum band may cause packet loss of the audio packets and/or the video packets, which may reduce the technical performance of the transmission via packet loss, or the like. Additionally, or alternatively, a user of the UE, a media content provider, or the like, may have preferences or requirements associated with the transmission of the audio packets and/or the video packets via the base station, as described below.

Implementations described herein enable a base station to dynamically allocate resources of an unlicensed RF spectrum band and/or a licensed RF spectrum band based on a set of rules that indicate a manner of transmission of audio packets and video packets, as described below. This may enable the base station to transmit the audio packets and the video packets via the unlicensed RF spectrum band and/or the licensed RF spectrum band based on the set of rules, thereby permitting a network operator to configure the base station to control the transmission of the audio packets and the video packets. In this way, the base station may conserve network resources and increase the technical performance of the transmission of the audio packets and/or the video packets to the UE or from the UE.

Figure 1B:
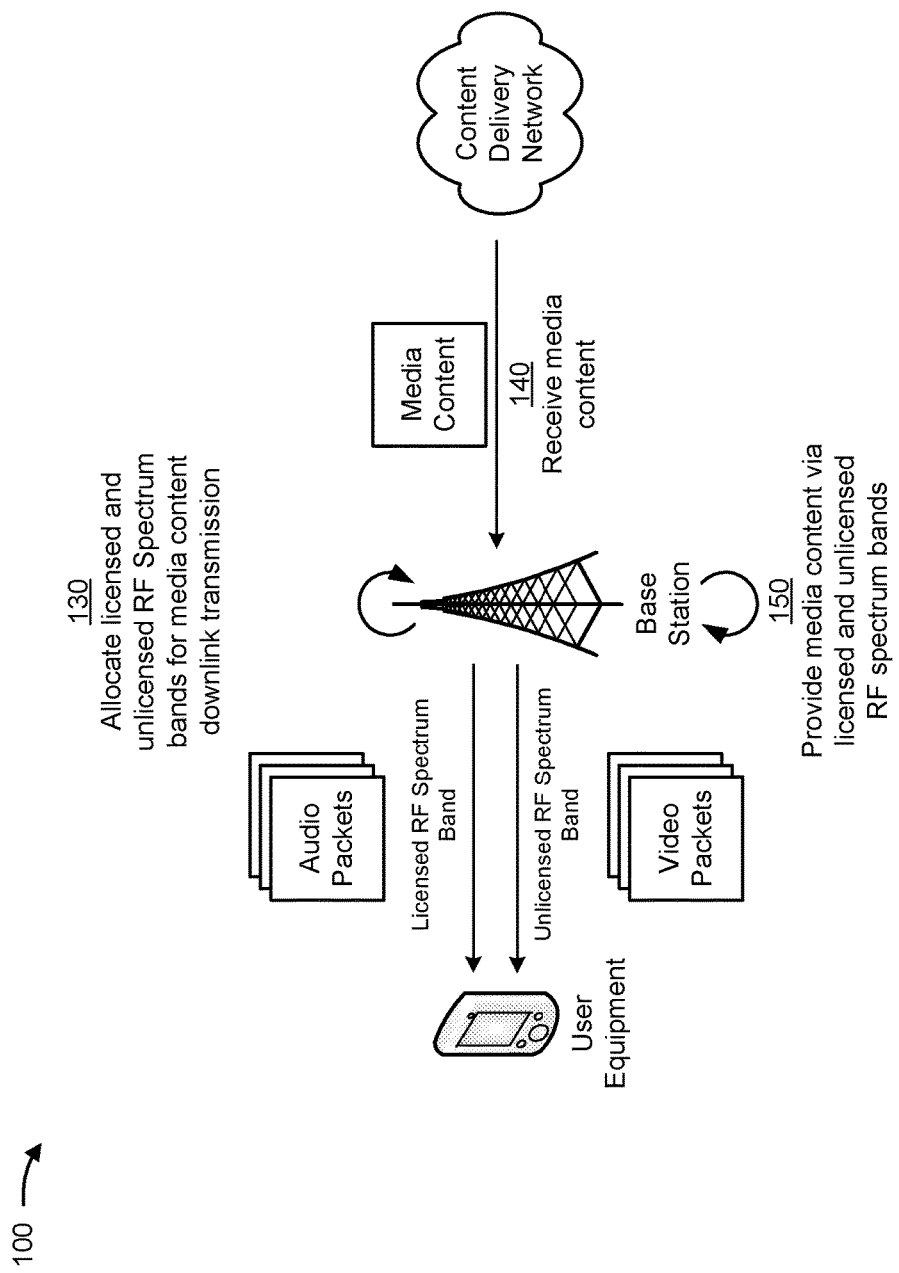

FIGS. 1A and 1B are diagrams of an overview of an example implementation 100 described herein. As shown in FIG. 1A, and by reference number 110, a base station may receive a downlink (DL) request for media content. For example, the base station may receive the request from a UE, such as a mobile phone, a tablet, or the like. The request may include a request for the transmission of media content from the base station to the UE. The media content associated with the request may be hosted by a content delivery network, which may include a video streaming server, or the like. The content delivery network may be on the same or a different network as the base station.

In some implementations, the media content may include audio packets corresponding to an audio portion of the media content, and video packets corresponding to a video portion of the media content. For example, the media content may include a video hosted by the content delivery network. In some implementations, the base station may relay the downlink request to the content delivery network via one or more other devices, such as a network gateway, or the like, as described below.

As shown by reference number 120, the base station may identify a set of rules for transmission of the media content. For example, the set of rules may be associated with the transmission of the audio packets and the video packets via an unlicensed RF spectrum band and/or via a licensed RF spectrum band. In some implementations, the set of rules may indicate that the base station is to transmit the audio packets and the video packets via the same RF spectrum band. For example, a rule may indicate that both the audio packets and the video packets are to be transmitted via the licensed RF spectrum band. As another example, a rule may indicate that the audio packets are to be transmitted via the licensed RF spectrum band and the video packets are to be transmitted via the unlicensed RF spectrum band.

As shown in FIG. 1B, and by reference number 130, the base station may allocate the licensed and unlicensed RF spectrum bands for media content downlink transmission. For example, the base station may allocate the resources of the licensed RF spectrum band, such as channels, time slots, or the like, of a frequency or a time domain, for the transmission of the audio packets. Additionally, or alternatively, the base station may allocate the resources of the unlicensed RF spectrum band for the transmission of the video packets. In some implementations, the base station may allocate the resources of the unlicensed RF spectrum band or the licensed RF spectrum band for transmission of both the audio packets and the video packets.

As shown by reference number 140, the base station may receive the media content (e.g., from the content delivery network). The media content may include separate audio packets and video packets. As shown by reference number 150, the base station may provide the media content via the licensed and the unlicensed RF spectrum bands. For example, for the purposes of example implementation 100, assume that the base station transmits, to the UE, the audio packets via the licensed RF spectrum band and the video packets via the unlicensed RF spectrum band.

Example implementation 100 relates to a downlink transmission between the base station and the UE. In some implementations, the base station or the UE may be configured to perform an uplink transmission, where the base station receives the audio packets and the video packets associated with the media content from the UE via the unlicensed RF spectrum band and/or the licensed RF spectrum band. The uplink transmission may include similar, different, or differently arranged operations as those described in example implementation 100, except that the transmission of data may be from the UE to the base station, rather than from the base station to the UE, as in the downlink transmission. For example, the base station may allocate resources for the UE to provide audio packets and video packets via the unlicensed RF spectrum band and/or the licensed RF spectrum band, as described in more detail elsewhere herein.

In this way, a base station may dynamically allocate the resources of an unlicensed RF spectrum band and/or a licensed RF spectrum band based on a set of rules, thereby conserving network resources. Additionally, or alternatively, the base station may increase a technical performance of the transmission by separately allocating the resources of the unlicensed RF spectrum band and/or the licensed RF spectrum band for the transmission of audio packets and video packets.

As indicated above, FIGS. 1A and 1B are provided merely as an example. Other examples are possible and may differ from what was described with regard to FIGS. 1A and 1B.

Figure 2:
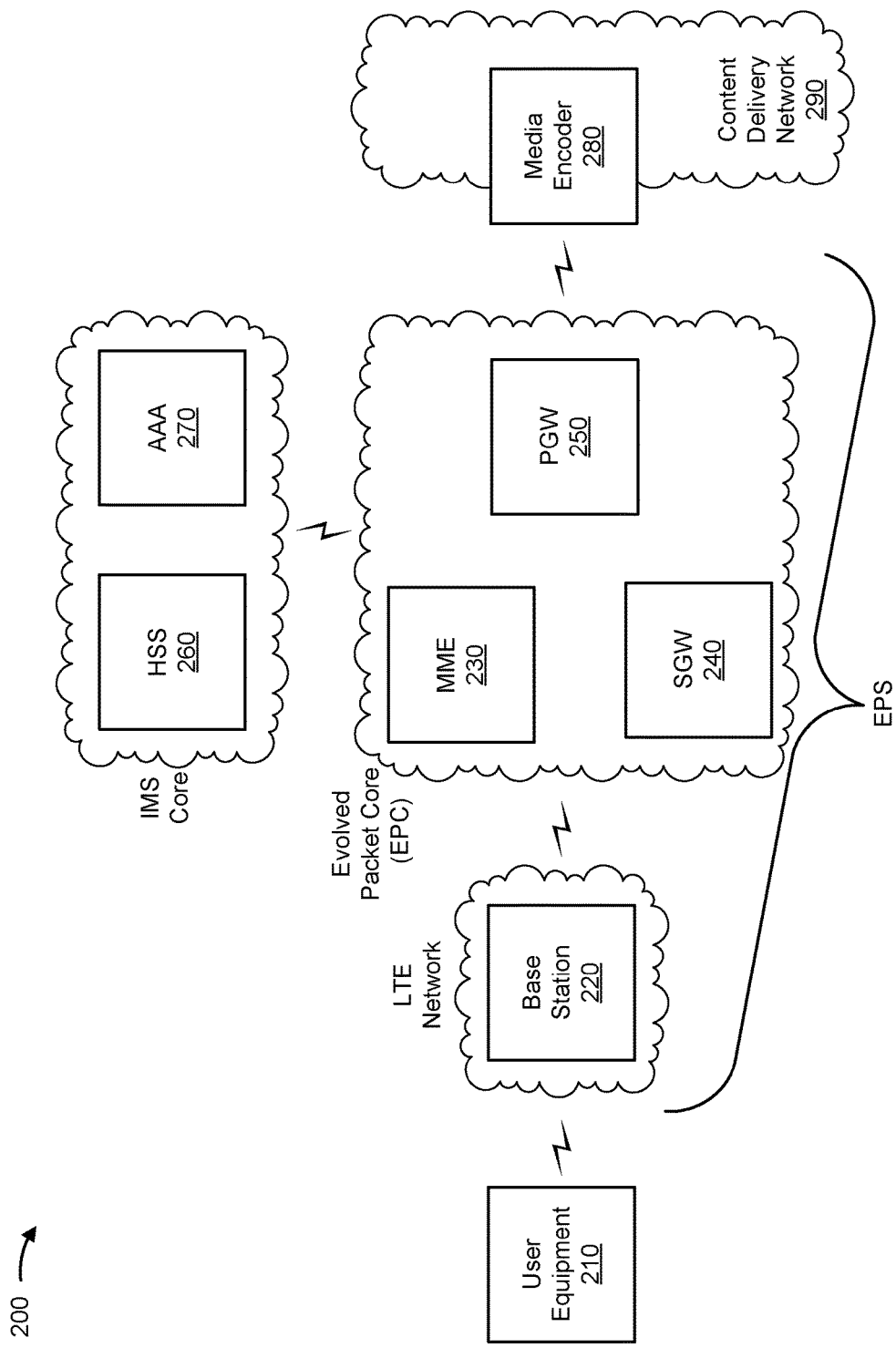
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user equipment 210, a base station 220, a mobility management entity device (MME) 230, a serving gateway (SGW) 240, a packet data network gateway (PGW) 250, a home subscriber server (HSS) 260, an authentication, authorization, and accounting server (AAA) 270, a media encoder 280, and a content delivery network 290. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network or a code division multiple access (CDMA) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 220 that take the form of evolved Node Bs (eNBs) via which user equipment 210 communicates with the EPC. The EPC may include MME 230, SGW 240, and/or PGW 250 that enable user equipment 210 to communicate with content delivery network 290 and/or an Internet protocol (IP) multimedia subsystem (IMS) core. The IMS core may include HSS 260 and/or AAA 270, and may manage device registration and authentication, session initiation, etc., associated with user equipments 210. HSS 260 and/or AAA 270 may reside in the EPC and/or the IMS core.

User equipment 210 may include one or more devices capable of communicating with base station 220 and/or a network (e.g., content delivery network 290). For example, user equipment 210 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, a wearable communication device (e.g., a smart wristwatch, a pair of smart eyeglasses, etc.) and/or a similar device. User equipment 210 may send traffic to and/or receive traffic from content delivery network 290 (e.g., via base station 220, SGW 240, and/or PGW 250).

Base station 220 may include one or more devices capable of transferring traffic, such as audio, video, text, and/or other traffic, destined for and/or received from user equipment 210. In some implementations, base station 220 may include an eNB associated with the LTE network that receives traffic from and/or sends traffic to content delivery network 290 via SGW 240 and/or PGW 250. Additionally, or alternatively, one or more base stations 220 may be associated with a RAN that is not associated with the LTE network. Base station 220 may send traffic to and/or receive traffic from user equipment 210 via an air interface. In some implementations, base station 220 may include a small cell base station, such as a base station of a microcell, a picocell, and/or a femtocell.

MME 230 may include one or more devices, such as one or more server devices, capable of managing authentication, activation, deactivation, and/or mobility functions associated with user equipment 210. In some implementations, MME 230 may perform operations relating to authentication of user equipment 210. Additionally, or alternatively, MME 230 may facilitate the selection of a particular SGW 240 and/or a particular PGW 250 to serve traffic to and/or from user equipment 210. MME 230 may perform operations associated with handing off user equipment 210 from a first base station 220 to a second base station 220 when user equipment 210 is transitioning from a first cell associated with the first base station 220 to a second cell associated with the second base station 220. Additionally, or alternatively, MME 230 may select another MME (not pictured), to which user equipment 210 should be handed off (e.g., when user equipment 210 moves out of range of MME 230).

SGW 240 may include one or more devices capable of routing packets. For example, SGW 240 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 240 may aggregate traffic received from one or more base stations 220 associated with the LTE network, and may send the aggregated traffic to content delivery network 290 (e.g., via PGW 250) and/or other network devices associated with the EPC and/or the IMS core. SGW 240 may also receive traffic from content delivery network 290 and/or other network devices, and may send the received traffic to user equipment 210 via base station 220. Additionally, or alternatively, SGW 240 may perform operations associated with handing off user equipment 210 to and/or from an LTE network.

PGW 250 may include one or more devices capable of providing connectivity for user equipment 210 to external packet data networks (e.g., other than the depicted EPC and/or LTE network). For example, PGW 250 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 250 may aggregate traffic received from one or more SGWs 240, and may send the aggregated traffic to content delivery network 290. Additionally, or alternatively, PGW 250 may receive traffic from content delivery network 290, and may send the traffic to user equipment 210 via SGW 240 and base station 220. PGW 250 may record data usage information (e.g., byte usage), and may provide the data usage information to AAA 270.

HSS 260 may include one or more devices, such as one or more server devices, capable of managing (e.g., receiving, generating, storing, processing, and/or providing) information associated with user equipment 210. For example, HSS 260 may manage subscription information associated with user equipment 210, such as information that identifies a subscriber profile of a user associated with user equipment 210, information that identifies services and/or applications that are accessible to user equipment 210, location information associated with user equipment 210, a network identifier (e.g., a network address) that identifies user equipment 210, information that identifies a treatment of user equipment 210 (e.g., quality of service information, a quantity of minutes allowed per time period, a quantity of data consumption allowed per time period, etc.), and/or similar information. HSS 260 may provide this information to one or more other devices of environment 200 to support the operations performed by those devices.

AAA 270 may include one or more devices, such as one or more server devices, that perform authentication, authorization, and/or accounting operations for communication sessions associated with user equipment 210. For example, AAA 270 may perform authentication operations for user equipment 210 and/or a user of user equipment 210 (e.g., using one or more credentials), may control access, by user equipment 210, to a service and/or an application (e.g., based on one or more restrictions, such as time-of-day restrictions, location restrictions, single or multiple access restrictions, read/write restrictions, etc.), may track resources consumed by user equipment 210 (e.g., a quantity of voice minutes consumed, a quantity of data consumed, etc.), and/or may perform similar operations.

Media encoder 280 may include one or more devices capable of encoding media content to form segments of media content. For example, media encoder 280 may include a server device or a similar type of device. In some implementations, media encoder 280 may receive media content (e.g., from content delivery network 290), and may encode the media content into multiple segments (e.g., segments having a particular size, a particular bitrate, a particular quality level, etc.). In some implementations, media encoder 280 may encode the media content into audio packets, that carry audio data of the media content, and video packets that carry video data of the media content. Media encoder 280 may provide segments of the media content for delivery to user equipment 210 via base station 220. In some implementations, one or more media encoders 280 (not pictured) may be associated with base station 220 and/or user equipment 210.

Content delivery network 290 may include one or more wired and/or wireless networks. In some implementations, content delivery network 290 may include a distributed system of content delivery server devices (e.g., in one or more data centers) to receive media content (e.g., from a content provider) and to provide the media content for distribution. For example, content delivery network 290 may include a wide area network (WAN), a metropolitan area network (MAN), a cellular network, a public land mobile network (PLMN), a local area network (LAN), a telephone network (e.g., the Public Switched Telephone Network (PSTN)), a private network, an ad hoc network, an intranet, the Internet, a fiber optic-based network, a television network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
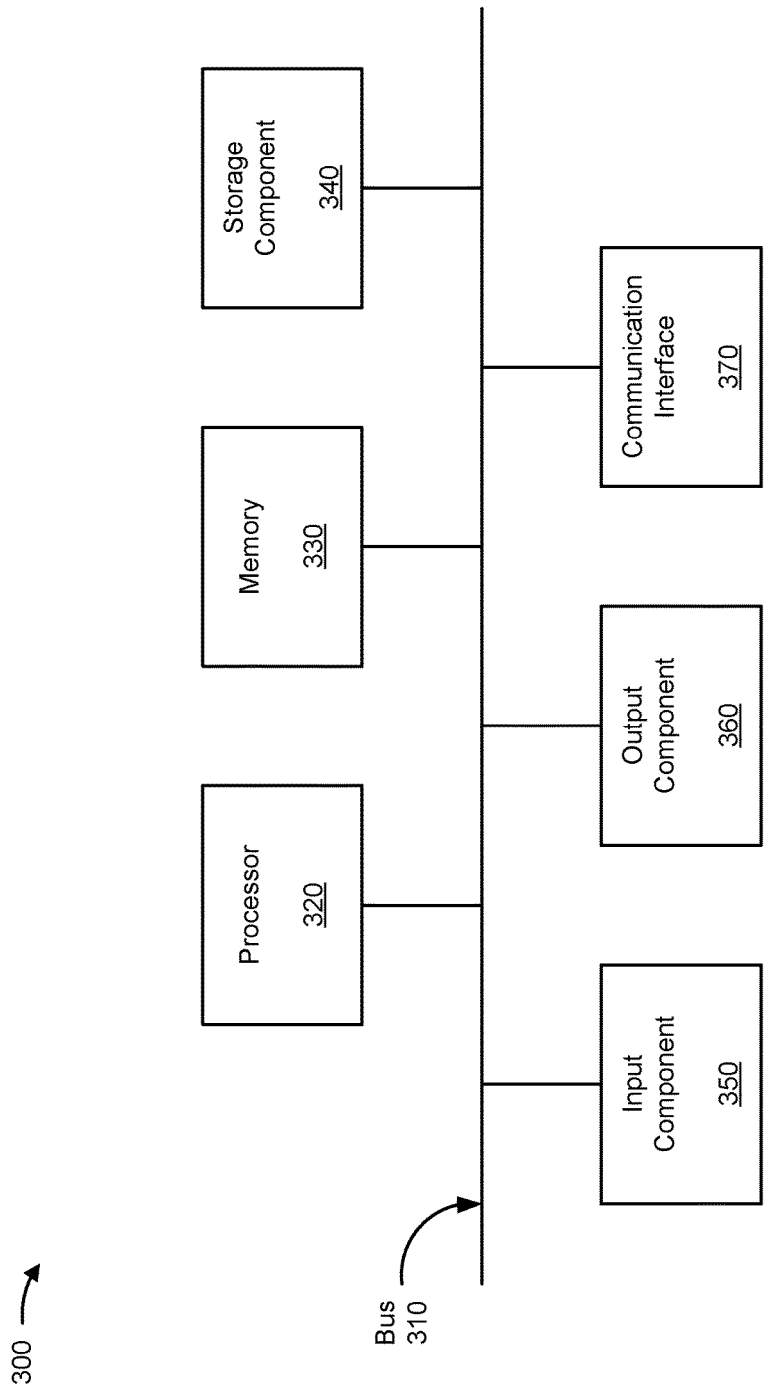
FIG. 3 is a diagram of example components of one or more devices of FIG. 2.

FIG. 3 is a diagram of example components of a device 300. Device 300 may correspond to user equipment 210, base station 220, MME 230, SGW 240, PGW 250, HSS 260, AAA 270, and/or media encoder 280. In some implementations, user equipment 210, base station 220, MME 230, SGW 240, PGW 250, HSS 260, AAA 270, and/or media encoder 280 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of non-transitory computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for allocating, based on a set of rules, resources of an unlicensed radio frequency spectrum band and/or a licensed radio frequency spectrum band for transmission of audio packets and video packets. In some implementations, one or more process blocks of FIG. 4 may be performed by base station 220. In some implementations, one or more process blocks of FIG. 4 may be performed by another device or a group of devices separate from or including base station 220, such as user equipment 210, MME 230, SGW 240, PGW 250, HSS 260, AAA 270, and/or media encoder 280.

As shown in FIG. 4, process 400 may include receiving a request associated with an uplink transmission or a downlink transmission corresponding to a transmission of media content that includes audio packets and video packets (block 410). For example, base station 220 may receive a request associated with an uplink transmission or a downlink transmission. The uplink transmission or the downlink transmission may be associated with a request to receive and/or provide media content that includes audio packets and video packets.

In some implementations, the request may be associated with both audio packets and video packets that correspond to media content (e.g., a streaming video, a live video, a pre-recorded video, etc.). For example, the media content may include an audio portion and a video portion. In some cases, the media content may be segmented into audio packets, corresponding to the audio portion of the media content, and video packets, corresponding to the video portion of the media content. In some implementations, media encoder 280 may segment the media content into the audio packets and the video packets.

In some implementations, the uplink transmission may be carried via a portion of a telecommunication channel used for the transmission of media content or other signals from user equipment 210 to base station 220. Additionally, or alternatively, the downlink transmission may be carried via a portion of the telecommunication channel used for the transmission of media content or other signals from base station 220 to user equipment 210. In some cases, the source or the destination of the transmission may be a device other than user equipment 210 or base station 220, such as a server device included in content delivery network 290, or the like.

Additionally, or alternatively, a network provider, such as the provider of a cellular network, may implement uplink transmissions and downlink transmissions together via the unlicensed RF spectrum band and/or the licensed RF spectrum band. For example, a network provider that uses license assisted access (LAA) technology may implement both downlink transmissions and uplink transmissions via the unlicensed RF spectrum band and/or the licensed RF spectrum band.

In contrast, the network provider may implement downlink transmissions alone via the unlicensed RF spectrum band without implementing uplink transmissions via the unlicensed RF spectrum band (e.g., in a supplemental downlink mode). For example, in long term evolution in unlicensed spectrum (LTE-U), the network provider may implement downlink transmissions via the unlicensed RF spectrum band and may implement uplink transmissions via the licensed RF spectrum band.

In some implementations, the uplink transmission request may include a service request from user equipment 210 when user equipment 210 has data to transmit to base station 220. The uplink transmission request may include one or more other requests from user equipment 210 to base station 220, such as a scheduling request, or the like. In some cases, base station 220 may transmit the request to another device to which base station 220 is connected, such as another device of the EPC.

Conversely, in a downlink transmission, user equipment 210 may request the transmission of audio packets and video packets associated with media content from content delivery network 290. The request may be transmitted to content delivery network 290 via base station 220 and one or more other devices to which base station 220 is connected. Base station 220 may then receive the audio packets and the video packets from content delivery network 290, via one or more other devices, for transmission to user equipment 210, as described below.

As further shown in FIG. 4, process 400 may include identifying a set of rules that indicate a manner in which the audio packets and the video packets are to be scheduled for transmission via an unlicensed RF spectrum band and/or a licensed RF spectrum band (block 420). For example, after base station 220 receives a request associated with the uplink transmission or the downlink transmission, base station 220 may identify the set of rules that indicate the manner of transmission of the audio packets and the video packets.

In some implementations, base station 220 may identify a set of rules that indicate that both the audio packets and the video packets are to be transmitted via the licensed RF spectrum band when a set of conditions is satisfied, which may increase technical performance of the transmission by reducing packet loss. Conversely, in some implementations, base station 220 may identify a set of rules that indicate that both the audio packets and the video packets are to be transmitted via the unlicensed RF spectrum band when a set of conditions is satisfied, which may conserve resources of the licensed RF spectrum band.

In some implementations, base station 220 may identify a set of rules that indicate that the audio packets and the video packets are to be transmitted via different RF spectrum bands when a set of conditions is satisfied, which may reduce packet loss for the packets transmitted via the licensed RF spectrum and conserve network resources by transmitting other packets via the unlicensed RF spectrum band. For example, the set of rules may indicate that the audio packets are to be transmitted via the licensed RF spectrum band and that the video packets are to be transmitted via the unlicensed RF spectrum band when a set of conditions is satisfied. As another example, the set of rules may indicate that the audio packets are to be transmitted via the unlicensed RF spectrum band and that the video packets are to be transmitted via the licensed RF spectrum band when a set of conditions is satisfied.

In some implementations, transmitting the audio packets and/or the video packets via the unlicensed RF spectrum band may conserve network resources of the licensed RF spectrum band, reduce network interference of the licensed RF spectrum band, increase network throughput of the licensed RF spectrum band, improve network signal quality of the licensed RF spectrum band, and reduce network congestion of the licensed RF spectrum band.

In some implementations, base station 220 may identify a rule based on receiving or determining allocation information associated with a set of conditions. For example, the set of conditions may be associated with a network condition (e.g., a level of network interference between base station 220 and user equipment 210, etc.), a user profile characteristic (e.g., a quality of service (QoS) guarantee, etc.), a data packet type (e.g., audio packets, video packets, etc.), or the like, as described below. The rule may indicate a manner of transmission of the audio packets and the video packets when a particular set of conditions is satisfied.

In some cases, a rule may be associated with one or more network conditions of a cell associated with base station 220 (e.g., a level of interference, a quantity of devices, etc.). For example, a rule may be associated with a level of interference on the unlicensed RF spectrum band and/or the licensed RF spectrum band, such as a level of electrical interference, a level of radio frequency interference, or the like. In some implementations, a first rule may apply to situations where there is a high level of interference (e.g., greater than a threshold) on the unlicensed RF spectrum band and/or the licensed RF spectrum band. Additionally, or alternatively, a second rule may apply to situations where there is a low level of interference (e.g., less than a threshold) on the unlicensed RF spectrum band and/or the licensed RF spectrum band.

As another example, a rule may be associated with a quantity of user devices connected to base station 220 (e.g., a large quantity, a medium quantity, a low quantity, etc.). In some implementations, a first rule may apply to situations where there is a large quantity of devices (e.g., greater than a threshold) connected to base station 220. Additionally, or alternatively, a second rule may apply to situations where there is a small quantity of devices (e.g., less than a threshold) connected to base station 220.

In some cases, user equipment 210, or another device, may report (e.g., via a measurement report, etc.) the network condition(s) to base station 220 so that base station 220 may identify a rule to be applied based on the network condition(s). Additionally, or alternatively, base station 220 may detect the network condition(s) without the assistance of user equipment 210 or another device.

In some implementations, a rule may be associated with a user profile type or a user profile characteristic. For example, a user profile may be associated with a QoS guarantee, such as a high QoS guarantee, a medium QoS guarantee, or a low QoS guarantee. Additionally, or alternatively, the user profile may be associated with a user priority level of the user profile, such as a high priority level, a medium priority level, a low priority level, or the like.

In some implementations, a rule may be associated with a user input (e.g., provided via user equipment 210). For example, a user of user equipment 210 may manually select, using user equipment 210, the manner of transmission of the audio packets and the video packets. Additionally, or alternatively, a rule may be associated with a data cap or data limit associated with user equipment 210. For example, a rule may indicate a first manner of transmission when user equipment 210 is within a particular percentage of the user's allowable data limit, and may indicate a second manner of transmission when user equipment 210 is within a different percentage of the user's allowable data limit. Additionally, or alternatively, a rule may be associated with a data threshold.

In some implementations, a rule may be associated with a service type of the media content. For example, the media content may be live media content (e.g., a live sporting event, a live video conference, etc.), pre-recorded media content (e.g., media content provided by an on-demand content provider, etc.), or the like. Additionally, or alternatively, the media content may be associated with a subscription of the user or user equipment 210, where, for example, the user has paid for the media content.

In some implementations, a rule may be associated with other allocation information or conditions, such as historical data about the network condition(s), particular times of the day or the week, whether the live media content was pre-scheduled, the intended destination of the audio packets and the video packets (e.g., a user that pays for the media content, etc.), the quality of the media content being transmitted (e.g., 720p, 1080p, etc.), or the like.

As discussed above, base station 220 may identify a rule that indicates a manner in which the audio packets and the video packets are to be transmitted, based on allocation information that identifies a set of conditions currently in place. In some implementations, a rule may be associated with a level of interference on the unlicensed RF spectrum band and/or the licensed RF spectrum band, as described above. For example, when the level of interference on the unlicensed RF spectrum band is high, transmission of media content may be subject to packet loss. In this case, the rule may indicate that both the audio packets and the video packets are to be transmitted via the licensed RF spectrum band, so as to reduce the occurrence of packet loss during the transmission.

As another example, the level of interference on the unlicensed RF spectrum band may be low. In this case, the rule may indicate that both the audio packets and the video packets are to be transmitted via the unlicensed RF spectrum band because the audio packets and the video packets may be subject to less packet loss due to the low level of interference on the unlicensed RF spectrum band.

In some implementations, both the unlicensed RF spectrum band and the licensed RF spectrum band may have a moderate level of interference, or the level of interference on both RF spectrums may be greater than a threshold. In this case, the rule may indicate that either the audio packets or the video packets, but not both, may be transmitted via the licensed RF spectrum band whereas the other packets may be transmitted via the unlicensed RF spectrum band.

In some implementations, base station 220 may apply a rule associated with a single condition to determine the manner of transmission of the audio packets and the video packets. In some implementations, base station 220 may apply a rule associated with multiple conditions to determine the manner of transmission of the audio packets and the video packets. In this case, base station 220 may generate a score for each of the multiple conditions and combine the scores to determine a total score that indicates whether the rule applies. In some implementations, base station 220 may assign weights to the scores before combining the scores to determine the total score.

In some implementations, base station 220 may apply different rules at different times based on receiving or determining different or changing allocation information over time. The different rules may indicate different manners of transmission of the audio packets and the video packets at different times.

In this way, dynamic allocation of the resources of the unlicensed RF spectrum band and/or the licensed RF spectrum band may be enabled, technical performance of the transmission may be increased, and network resources may be conserved.

As further shown in FIG. 4, process 400 may include allocating, based on the set of rules, resources of the unlicensed RF spectrum band and/or the licensed RF spectrum band for transmission of the audio packets and the video packets (block 430). For example, base station 220 may allocate (e.g., reserve) channels, timeslots, or the like, of a frequency domain or a time domain of the unlicensed RF spectrum band and/or the licensed RF spectrum band for transmission of the audio packets and the video packets to or from user equipment 210. The allocation may be based on the set of rules identified by base station 220.

In some implementations, base station 220 may allocate resources of the licensed RF spectrum band for transmission of both the audio packets and the video packets. In some implementations, base station 220 may allocate resources of the unlicensed RF spectrum band for transmission of both the audio packets and the video packets. In some implementations, base station 220 may allocate resources of the licensed RF spectrum band for transmission of the audio packets and may allocate resources of the unlicensed RF spectrum band for transmission of the video packets. In some implementations, base station 220 may allocate resources of the unlicensed RF spectrum band for transmission of the audio packets and may allocate resources of the licensed RF spectrum band for transmission of the video packets.

In some implementations, base station 220 may allocate resources of the unlicensed RF spectrum band and/or the licensed RF spectrum band after evaluating network traffic, network conditions, other allocation information, conditions, or the like, as described above. Additionally, or alternatively, base station 220 may dynamically allocate resources of the unlicensed RF spectrum band and/or the licensed RF spectrum band based on determining different allocation information. In this case, base station 220 may continually, periodically, or intermittently, reallocate the resources of the unlicensed RF spectrum band and/or the licensed RF spectrum band based on changes in allocation information.

For example, base station 220 may periodically reevaluate the network condition(s) every 30 seconds during the transmission to or from user equipment 210. For example, base station 220 may initially allocate the resources of the unlicensed RF spectrum band and/or the licensed RF spectrum band in a first way in response to significant network interference on the unlicensed RF spectrum band but later, after reevaluating the network condition(s), reallocate the resources of the unlicensed RF spectrum band and/or the licensed RF spectrum band in a second way in response to a decrease in the network interference on the unlicensed RF spectrum band.

Additionally, or alternatively, base station 220 may allocate the resources of the unlicensed RF spectrum band and/or the licensed RF spectrum band, based on combining one or more sets of rules, in an allocation different from any one of the combined sets of rules. For example, base station 220 may determine that the network interference on the unlicensed RF spectrum band is high and, additionally, that the user has selected a low priority level on user equipment 210.

In this case, the set of rules associated with the high network interference may be associated with a first allocation but, conversely, the set of rules associated with the low priority level user choice may be associated with a second allocation. In this case, base station 220 may allocate the resources of the unlicensed RF spectrum band and/or the licensed RF spectrum band in a third allocation, which may be different from, but include elements of, the first allocation and/or the second allocation.

In this way, network interference may be reduced, network throughput may be increased, network signal quality may be improved, and network congestion may be reduced.

As further shown in FIG. 4, process 400 may include providing or receiving the audio packets and the video packets via the unlicensed RF spectrum band and/or the licensed RF spectrum band based on allocating the resources of the unlicensed RF spectrum band and/or the licensed RF spectrum band (block 440). For example, after base station 220 has allocated the resources of the unlicensed RF spectrum band and/or the licensed RF spectrum band, base station 220 may provide or receive the audio packets and the video packets via the unlicensed RF spectrum band and/or the licensed RF spectrum band.

In some implementations, base station 220 may have allocated the resources in association with an uplink transmission. In this case, base station 220 may receive the audio packets and the video packets from user equipment 210 via, for example, one or more uplink channels. Additionally, or alternatively, base station 220 may transmit the audio packets and the video packets to one or more devices to which base station 220 is connected. In some cases, base station 220 may synchronize the audio packets and the video packets into an unsegmented media content using a media decoder, prior to relaying the media content.

Conversely, in some implementations, base station 220 may have allocated the resources in association with a downlink transmission. In this case, base station 220 may transmit the audio packets and the video packets from one or more devices to which base station 220 is connected to user equipment 210, via one or more downlink channels. In some cases, base station 220 may encode the media content into audio packets and video packets using a media encoder (e.g., media encoder 280) associated with base station 220, prior to transmitting the audio packets and the video packets to user equipment 210.

In this way, network interference may be reduced, network throughput may be increased, network signal quality may be improved, and network congestion may be reduced.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may enable dynamic allocation of resources of an unlicensed RF spectrum band and/or a licensed RF spectrum band. The allocation may be based on a set of rules associated with a manner of transmission of audio packets and video packets associated with media content. This may reduce computing resources needed for transmission of the audio packets and the video packets between a user equipment and a content delivery network, via a base station. In addition, this may enable receipt of one or more uplink requests or downlink requests, increase technical performance of the transmission, conserve network resources, reduce network interference, increase throughput, improve signal quality, reduce network congestion, or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors to:
receive a request associated with a transmission of media content that includes audio packets and video packets,
the audio packets corresponding to an audio portion of the media content and the video packets corresponding to a video portion of the media content;
identify a rule that indicates a manner in which the audio packets and the video packets are to be scheduled for transmission via an unlicensed radio frequency (RF) spectrum band and a licensed RF spectrum band, the rule being associated with one or more network conditions including:
a quantity of other devices connected to the device, and
a threshold level of interference;
allocate, based on the quantity of other devices connected to the device and a level of interference on the unlicensed RF spectrum band satisfying the rule:
resources of the unlicensed RF spectrum band for a first transmission of the audio packets and resources of the licensed RF spectrum band for a second transmission of the video packets, or
the resources of the unlicensed RF spectrum band for the second transmission of the video packets and the resources of the licensed RF spectrum band for the first transmission of the audio packets;
provide or receive the audio packets and the video packets via the unlicensed RF spectrum band and the licensed RF spectrum band based on allocating the resources of the unlicensed RF spectrum band and the resources of the licensed RF spectrum band;
periodically reevaluate the one or more network conditions; and
periodically reallocate, based on periodically reevaluating the one or more network conditions, the resources of the unlicensed RF spectrum band and the resources of the licensed RF spectrum band.

2. The device of claim 1, where the rule is associated with the quantity of other devices, connected to the device, satisfying a threshold.

3. The device of claim 1, where the one or more network conditions relate to one or more of:
a user profile type,
a user profile characteristic,
a data packet type,
a data cap,
a data limit,
a data threshold, or
a service type.

4. The device of claim 1, where one of the first transmission of the audio packets or the second transmission of the video packets is an uplink transmission.

5. The device of claim 1, where one of the first transmission of the audio packets or the second transmission of the video packets is a downlink transmission.

6. The device of claim 1, where the one or more processors, when periodically reallocating the resources of the unlicensed RF spectrum band and the resources of the licensed RF spectrum band, are to:
periodically reallocate, based on determining a decrease in network interference on the unlicensed RF spectrum band, the resources of the unlicensed RF spectrum band and the resources of the licensed RF spectrum band.

7. The device of claim 1, where the one or more processors, when allocating the resources of the unlicensed RF spectrum band and the resources of the licensed RF spectrum band, are to:
allocate, based on combining a set of rules, the resources of the unlicensed RF spectrum band and the resources of the licensed RF spectrum band in an allocation that is different from any one of the set of rules.

8. A non-transitory computer-readable medium storing instructions, the instructions comprising:
one or more instructions that, when executed by one or more processors of a base station, cause the one or more processors to:
receive a request for a transmission of one or more audio packets and one or more video packets;
identify one or more rules associated with allocating resources of a licensed radio frequency (RF) spectrum band or an unlicensed RF spectrum band for the transmission of the one or more audio packets and the one or more video packets,
the one or more rules being associated with one or more network conditions associated with the base station including:
a quantity of other devices connected to the base station, and
a threshold level of interference;
reserve, based on the quantity of other devices connected to the base station and a level of interference on the unlicensed RF spectrum band satisfying the rule:
first resources of the licensed RF spectrum band for a first transmission of the one or more audio packets and second resources of the unlicensed RF spectrum band for a second transmission of the one or more video packets, or
the first resources of the licensed RF spectrum band for the second transmission of the one or more video packets and the second resources of the unlicensed RF spectrum band for the first transmission of the one or more audio packets,
the first transmission of the one or more audio packets and the second transmission of the one or more video packets being between the base station and a user equipment;
provide or receive the one or more audio packets and the one or more video packets via the licensed RF spectrum band or the unlicensed RF spectrum band based on reserving the first resources and the second resources;
periodically reevaluate the one or more network conditions; and
periodically reallocate, based on periodically reevaluating the one or more network conditions, the first resources of the licensed RF spectrum band and the second resources of the unlicensed RF spectrum band.

9. The non-transitory computer-readable medium of claim 8, where the one or more instructions, when executed by the one or more processors, further cause the one or more processors to:
determine that the first resources of the licensed RF spectrum band are not to be reserved for a third transmission of the one or more audio packets and the one or more video packets; and
reserve the second resources of the unlicensed RF spectrum band for the third transmission of the one or more audio packets and the one or more video packets.

10. The non-transitory computer-readable medium of claim 8, where the first resources and the second resources include one or more channels or one or more time slots.

11. The non-transitory computer-readable medium of claim 8, where at least one of the first transmission of the one or more audio packets or the second transmission of the one or more video packets is a downlink transmission from the base station to the user equipment.

12. The non-transitory computer-readable medium of claim 8, where at least one of the first transmission of the one or more audio packets or the second transmission of the one or more video packets is an uplink transmission from the user equipment to the base station.

13. The non-transitory computer-readable medium of claim 8, where the one or more instructions, that cause the one or more processors to provide or receive the one or more audio packets and the one or more video packets, cause the one or more processors to:
  encode the one or more audio packets and the one or more video packets separately when the one or more audio packets and the one or more video packets are associated with a downlink transmission, or
  synchronize the one or more audio packets and the one or more video packets when the one or more audio packets and the one or more video packets are associated with an uplink transmission.

14. The non-transitory computer-readable medium of claim 8, when executed by the one or more processors, further cause the one or more processors to:
  provide or receive the one or more audio packets and the one or more video packets via the licensed RF spectrum band or the unlicensed RF spectrum band based on reallocating the first resources and the second resources.

15. A method, comprising:
  receiving, by a base station, a request for a transmission of media content,
    the media content including an audio portion and a video portion;
  determining, by the base station, a set of rules associated with the transmission of the media content,
    the set of rules being associated with one or more network conditions including:
      a quantity of other devices connected to the base station, and
      a threshold level of interference, and
    the set of rules indicating a manner of the transmission of the media content;
  assigning, by the base station and based on the quantity of other devices connected to the base station and a level of interference on an unlicensed radio frequency (RF) spectrum band satisfying a rule of the set of rules:
    resources of the unlicensed RF spectrum band for a first transmission of the audio portion and resources of a licensed RF spectrum band for a second transmission of the video portion, or
    the resources of the unlicensed RF spectrum band for the second transmission of the video portion and the resources of the licensed RF spectrum band for the first transmission of the audio portion;
  providing or receiving, by the base station, the media content via the unlicensed RF spectrum bands and the licensed RF spectrum band based on assigning the resources of the unlicensed RF spectrum band and the resources of the licensed RF spectrum band;
  periodically reevaluating, by the base station, the one or more network conditions; and
  periodically reallocating, by the base station and based on periodically reevaluating the one or more network conditions, the resources of the unlicensed RF spectrum band and the resources of the licensed RF spectrum band.

16. The method of claim 15, where:
  the transmission of the media content is an uplink transmission,
    the media content being transmitted from a user equipment to the base station, or
  the transmission of the media content is a downlink transmission,
    the media content being transmitted from the base station to the user equipment.

17. The method of claim 15, where the media content includes audio packets and video packets.

18. The method of claim 15, where:
  a first rule of the set of rules is associated with a level of interference on at least one of the unlicensed RF spectrum or the licensed RF spectrum satisfying the threshold level of interference; and
  a second rule of the set of rules is associated with a level of interference on at least one of the unlicensed RF spectrum or the licensed RF spectrum not satisfying the threshold level of interference.

19. The method of claim 15, where the set of rules include a rule associated with a priority level of a user.

20. The method of claim 15, where allocating the resources of the unlicensed RF spectrum band and the resources of the licensed RF spectrum band comprises:
  allocating, based on combining the set of rules, the resources of the unlicensed RF spectrum band and the resources of the licensed RF spectrum band in an allocation that is different from any one of the set of rules.

* * * * *